United States Patent [19]

Flaig

[11] Patent Number: 5,811,733
[45] Date of Patent: Sep. 22, 1998

[54] BUSWAY ELBOW DEVICE

[75] Inventor: Robert E. Flaig, Somerville, Ohio

[73] Assignee: Square D Company, Palatine, Ill.

[21] Appl. No.: 895,293

[22] Filed: Jul. 16, 1997

[51] Int. Cl.$^6$ .................................................. H02G 15/08
[52] U.S. Cl. ........................ 174/72 B; 439/212; 439/213
[58] Field of Search ................................ 174/68.2, 72 B, 174/70 B, 71 B, 88 B, 99 B, 133 B; 439/207, 210, 212, 213, 214; 361/775

[56] References Cited

U.S. PATENT DOCUMENTS

| | | | |
|---|---|---|---|
| 2,320,332 | 5/1943 | Morten | 174/74 R |
| 2,647,940 | 8/1953 | Swerdlow et al. | 174/99 E |
| 3,004,097 | 10/1961 | Johnston et al. | 174/88 B |
| 3,287,487 | 11/1966 | Fehr, Jr. | 174/71 B |
| 3,519,730 | 7/1970 | Fouse et al. | 174/88 B |
| 3,614,297 | 10/1971 | Carlson | 174/88 B |
| 4,262,163 | 4/1981 | Durrell et al. | 174/34 |
| 4,781,255 | 11/1988 | Lock et al. | 174/97 |
| 5,008,484 | 4/1991 | Wagener | 174/68.2 |

*Primary Examiner*—Kristine L. Kincaid
*Assistant Examiner*—Joseph Waks
*Attorney, Agent, or Firm*—Larry I. Golden; David R. Stacey; Larry T. Shrout

[57] ABSTRACT

A busway elbow fitting for a busway electrical distribution system. The elbow includes a first straight busway section having a housing and a plurality of electrical busbars enclosed within the housing. The first straight section has one standard terminating end and one mitered end wherein the housing and the busbars are cut to a predetermined angle with respect to the first straight section. The elbow also includes a second straight busway section having a housing and a plurality of electrical busbars enclosed within the housing. The second straight section has one standard terminating end and one mitered end wherein the housing and the busbars are cut to a predetermined angle with respect to the second straight section. The mitered ends of the first and second busway sections are complementary such that when the mitered ends are placed in juxtaposed position a desired angle is formed between the first and second busway straight sections. A joint connector is placed intermediate the mitered ends for electrically and mechanically connecting the electrical busbars of the first and second straight busway sections together.

4 Claims, 6 Drawing Sheets

BUSWAY ELBOW DEVICE

FIELD OF THE INVENTION

This invention relates to busway electrical distribution systems and more specifically to a busway elbow fitting.

BACKGROUND OF THE INVENTION

Busway electrical distribution systems are well known in the art of electrical distribution. Busway systems are comprised of a number of factory assembled straight sections manufactured in both standard and special lengths, associated fitting such as elbows, T's, crosses, offsets, etc., and joint connectors required to build a complete electrical distribution system. Each straight section and fitting includes a number of individually insulated generally flat electrical conductors or busbars stacked one upon another and enclosed within a housing which provides protection and support for the busbars. Each busbar in a stack carries one phase of electrical current in the system. In high current busway devices, multiple stacks of busbars are employed, each carrying a portion of the system current. The enclosure is made from a duct top and a duct bottom which cover the flat surface of the busbars and two duct sides which cover the edges of the busbars. At each end of the straight length or fitting the busbars are flared apart for receiving a joint connector. The joint connector is placed between adjacent ends of busway straight sections or fittings for electrically and mechanically connecting those adjoining sections and/or fittings together. Fittings are much more labor intensive to manufacture than a straight length since a number of small parts are required in their construction. For example, in a simple 90° flatwise elbow, the housing top and bottom are each made from two pieces, each piece having one end miter cut at 45°. The mitered ends must be spot welded together by using a rabbet which overlaps the ends and covers the miter seam between them. The duct sides are made in the same manner. The electrical busbars are also made from two pieces, each having one end miter cut at 45° and the other flared for the joint connector. Their mitered ends are seam welded together which leaves a weld bead extending above the flat surface of the busbar and generally some weld splatter on the flat surface. The weld must be ground smooth and the weld splatter removed so that the insulation applied over the busbar is not punctured by any sharp points resulting from the weld bead or weld splatter. Further, since the weld beads of each busbar in the stack are in approximately the same location the weld beads would cause build up in thickness at that location, causing a bulge and possible rupture in the housing. This welding and grinding is extremely labor intensive and therefore significantly increases the cost of manufacturing the elbow fitting. For manufacturing simplicity, elbow fittings generally have legs of a minimum and equal length. In some applications two elbows may be assembled together to provide an offset in the busway run. If the required length of the offset cannot be obtained by using a combination of standard straight lengths with the elbow a special length offset fitting may be required. The same technology is used in manufacturing the offset fitting as in the elbow. This special length offset fitting must be specially engineered thus further increasing the cost. Accordingly, it would be desirable to develop an elbow fitting which would significantly reduce the part count and manufacturing time thereby reducing cost and also providing an easy solution to any special length leg requirements in both elbows and offsets.

SUMMARY OF THE INVENTION

The busway elbow fitting of the present invention provides an elbow fitting which requires no welding of the busway housing or busbars and no grinding of the busbars. The elbow of the present invention requires about the same manufacturing time as a busway straight length device. The busway elbow of the present invention includes two modified straight length devices, each having one end of the housing and its enclosed busbars cut to a desired miter angle. Since each leg is a modified straight length any special length requirements may be incorporated in the cutting of the mitered end. The elbow is field assembled by placing a joint connector between the two mitered ends and tightening to make the elbow. For offset devices, two straight lengths as described above are used while another straight length of desired length having two oppositely mitered ends is placed between the two elbow type straight lengths. The three sections are field assembled with two joint connectors.

Other features and advantages of the invention will become apparent to those skilled in the art upon review of the following detailed description, claims and drawings.

Figure 1:
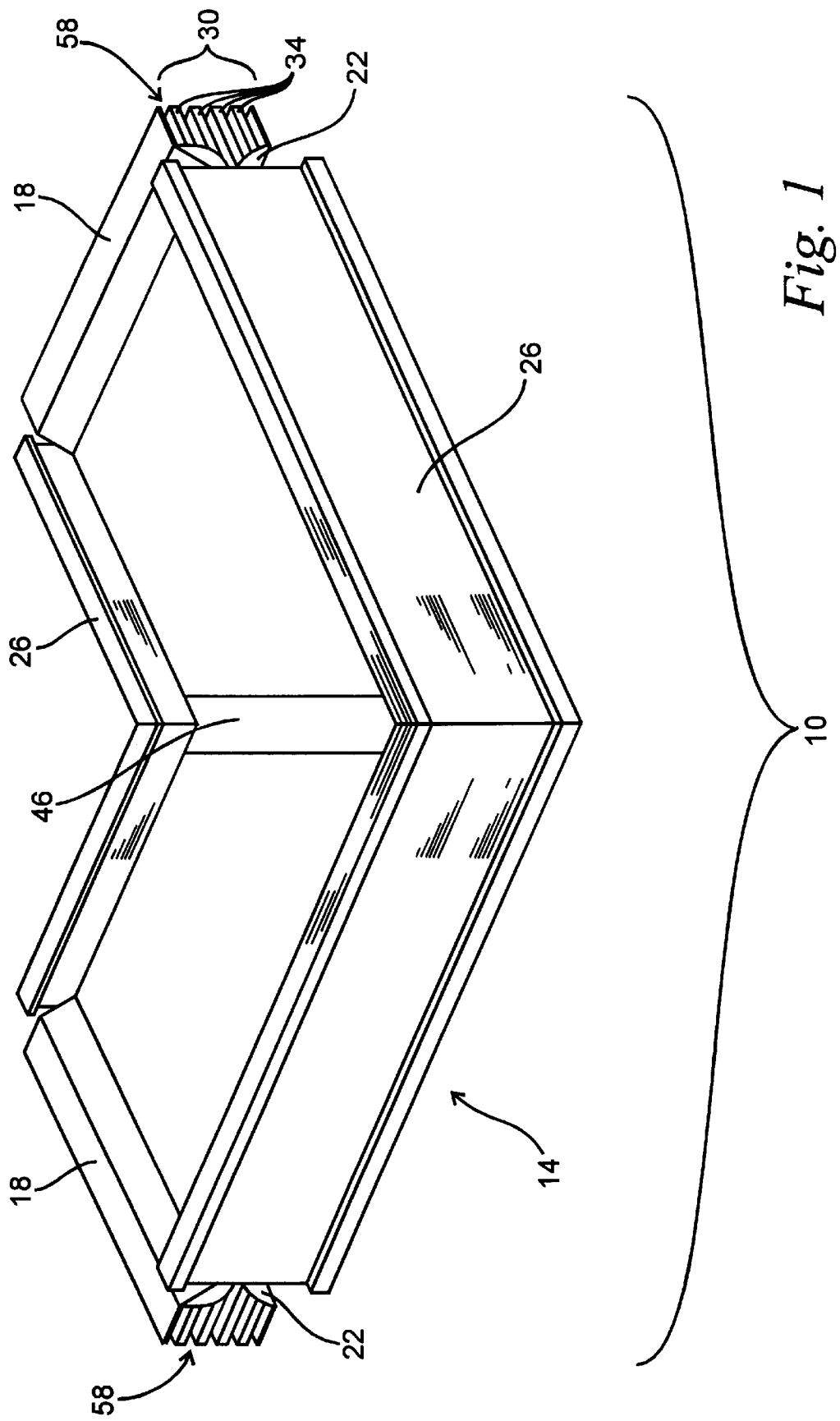
FIG. 1 is an isometric view of a busway elbow of the prior art.

Before one embodiment of the invention is explained in detail, it is to be understood that the invention is not limited in its application to the details of construction and description or illustrated in the drawings. The invention is capable of other embodiments and of being practiced or being carried out in various other ways. Further, it is to be understood that the phraseology and terminology used herein is for the purpose of description and should not be regarded as limiting.

DESCRIPTION OF THE PREFERRED EMBODIMENT

FIG. 1 illustrates a typical sectionalized busway electrical distribution system elbow known in the art and generally indicated by reference numeral 10. The elbow 10 consists of an enclosure generally indicated by reference numeral 14. The enclosure 14 includes a duct top 18, a duct bottom 22 (shown in FIG. 2), and two duct sides 26. Housed within the enclosure 14 is a conductor stack 30. The conductor stack 30 is composed of a number of individually insulated generally flat electrical conductors 34 or busbars. These conductors 34 are arranged one upon another to form the conductor stack 30. Generally one conductor 34 is provided for each electrical phase of the distribution system. However, in high current systems the enclosure 14 may enclose multiple conductor stacks 30, each conductor stack 30 carrying a generally equal portion of the total system current. In a preferred embodiment, the duct top 18 and duct bottom 22 are made from electrically conductive material such that the system ground current may be carried by them.

Figure 2:
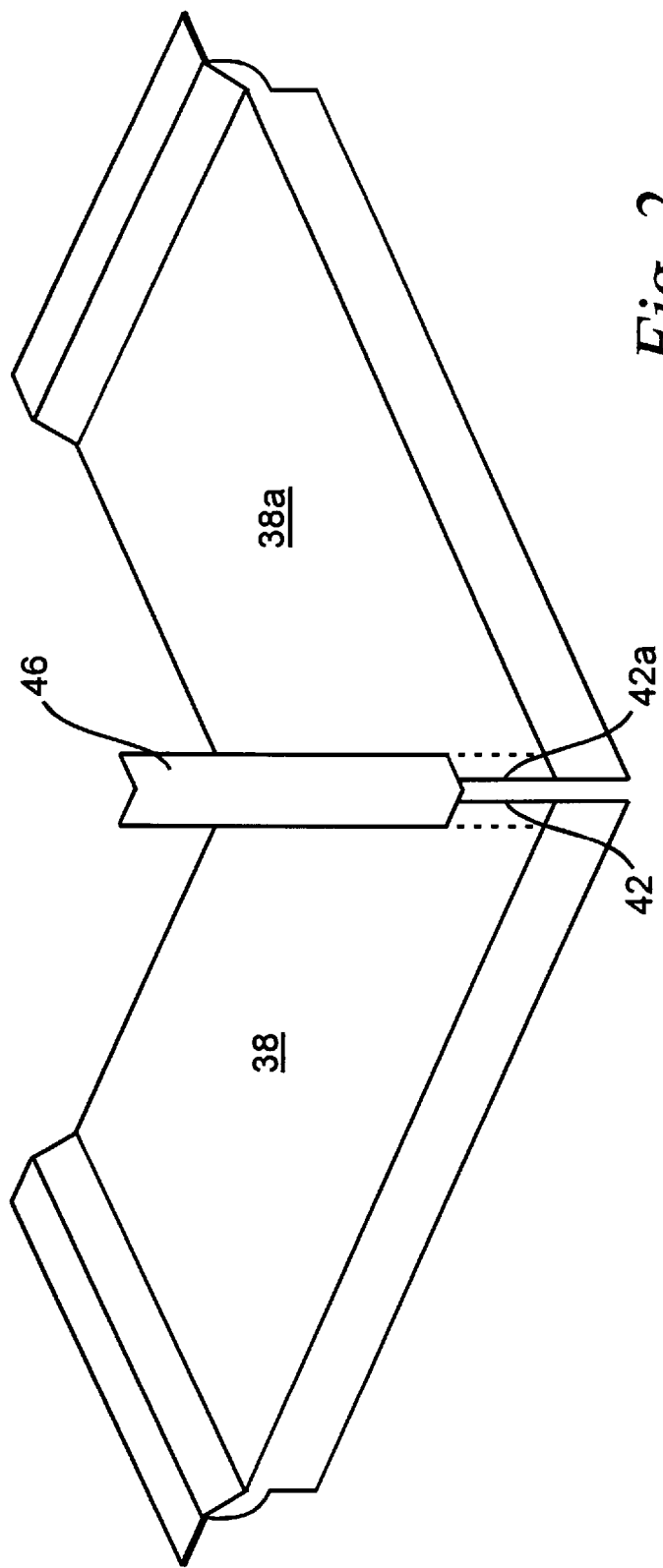
FIG. 2 is an exploded view of a typical busway elbow duct top of the prior art.

Referring now to FIG. 2, it can be seen that the duct top 18 is made from two pieces 38 and 38a of electrically conductive material. Each of the pieces 38 and 38a has one miter cut end 42 and 42a. The miter cut ends 42 and 42a are complementary such that when they are placed in a juxtaposed position a desired angle such as 90° is maintained between the straight portions of the two pieces 38 and 38a. The two pieces 38 and 38a are spot welded together with the aid of a rabbet 46 which covers the gap between the two mitered ends 42 and 42a. The duct bottom 22 is constructed in the same manner as the duct top 18.

Figure 3:
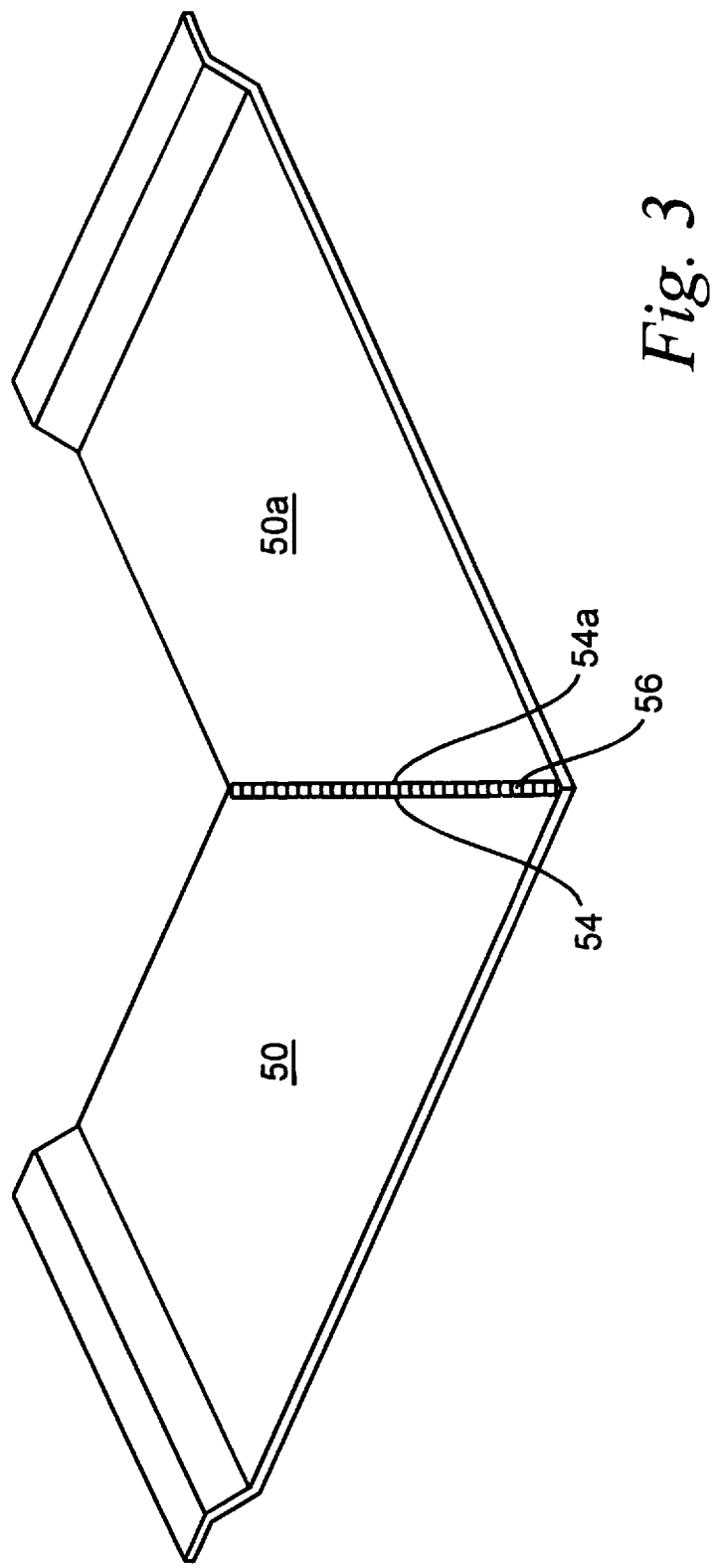
FIG. 3 is an isometric view of a typical busway elbow welded busbar of the prior art.
Figure 4:
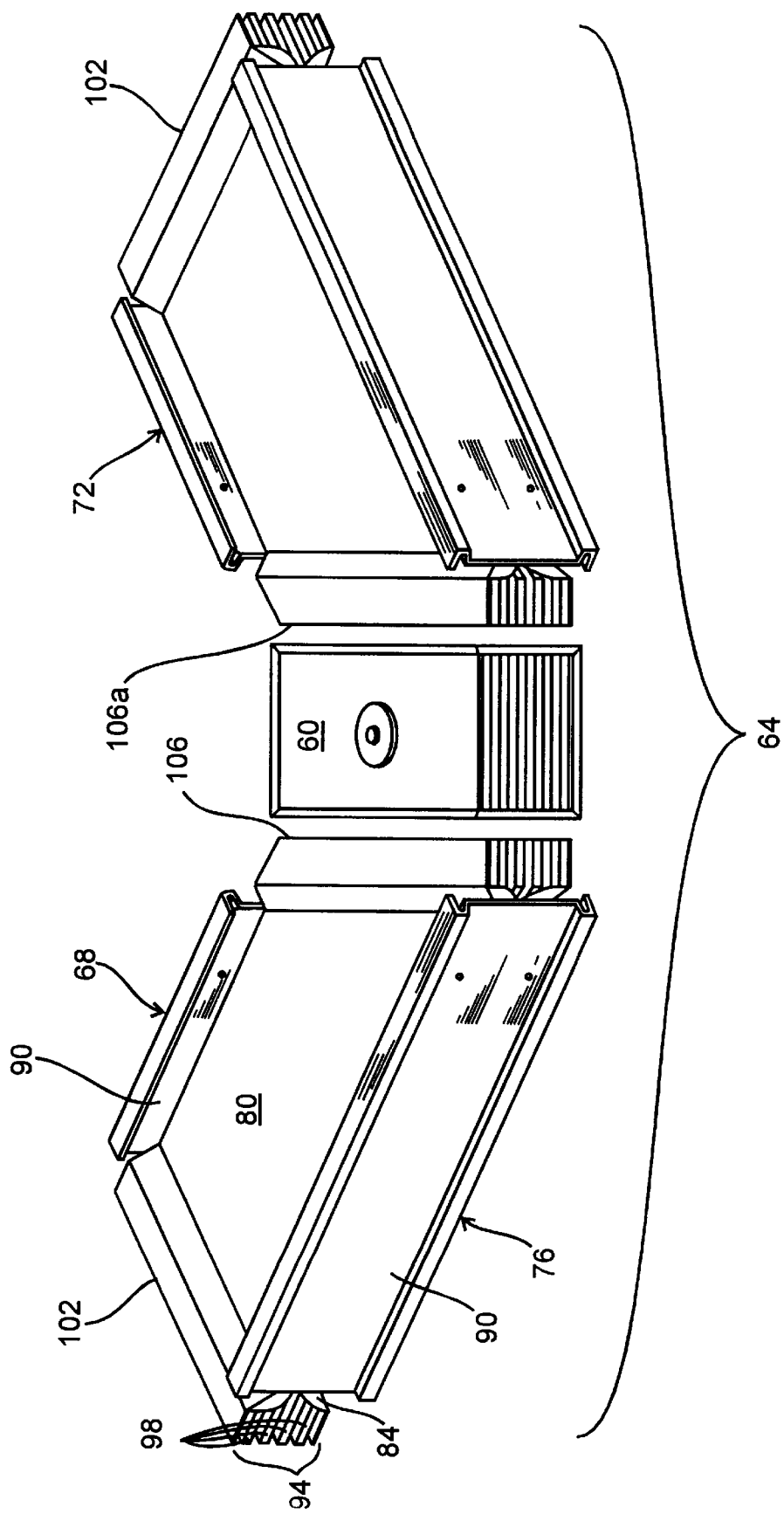
FIG. 4 is a view of the busway elbow components in accordance with the present invention.

In FIG. 3 a typical conductor 34 is illustrated, only one conductor 34 will be discussed since all of the conductors 34 in a stack 30 are manufactured in the same manner. The conductor 34 is made from two pieces 50 and 50a of electrically conductive material such as aluminum or copper. Each conductor piece 50 and 50a has one miter cut end 54 and 54a corresponding to the miter cut end 42 and 42a of the duct top and bottom, 18 and 22 respectively. The mitered ends 54 and 54a of the conductors 34 are placed in a juxtaposed position and seam welded together producing the same desired angle as previously produced by welding the two pieces 38 and 38a of the duct top 18 and bottom 22 together. As with any seam weld, a weld bead 56 extending slightly above the generally flat surface of the conductor 34 is produced along with some weld splatter which may stick to the surface of the conductor 34. Both the weld bead 56 and the weld splatter must be removed before individually insulating each conductor 34 and forming the conductor stack 30. In an alternate construction of a 90° elbow the conductor ends may be square cut and butt welded together (end of one piece to side of the other piece) to form the 90° angle. In the alternate construction the weld bead and splatter is still a problem. As with any sectionalized busway distribution system, each section is provided with standard terminating ends 58 (FIG. 1) which provide the means for making an electrical and a mechanical connection between adjacent sections of the sectionalized busway distribution system. In most systems the conductors 34 are spaced apart at the standard terminating ends 58 for receiving a joint connector 60 such as shown in FIG. 4 and described in U.S. Pat. No. 4,705,334, issued Nov. 10, 1987, assigned to the present assignee and herein incorporated by reference.

Figure 5:
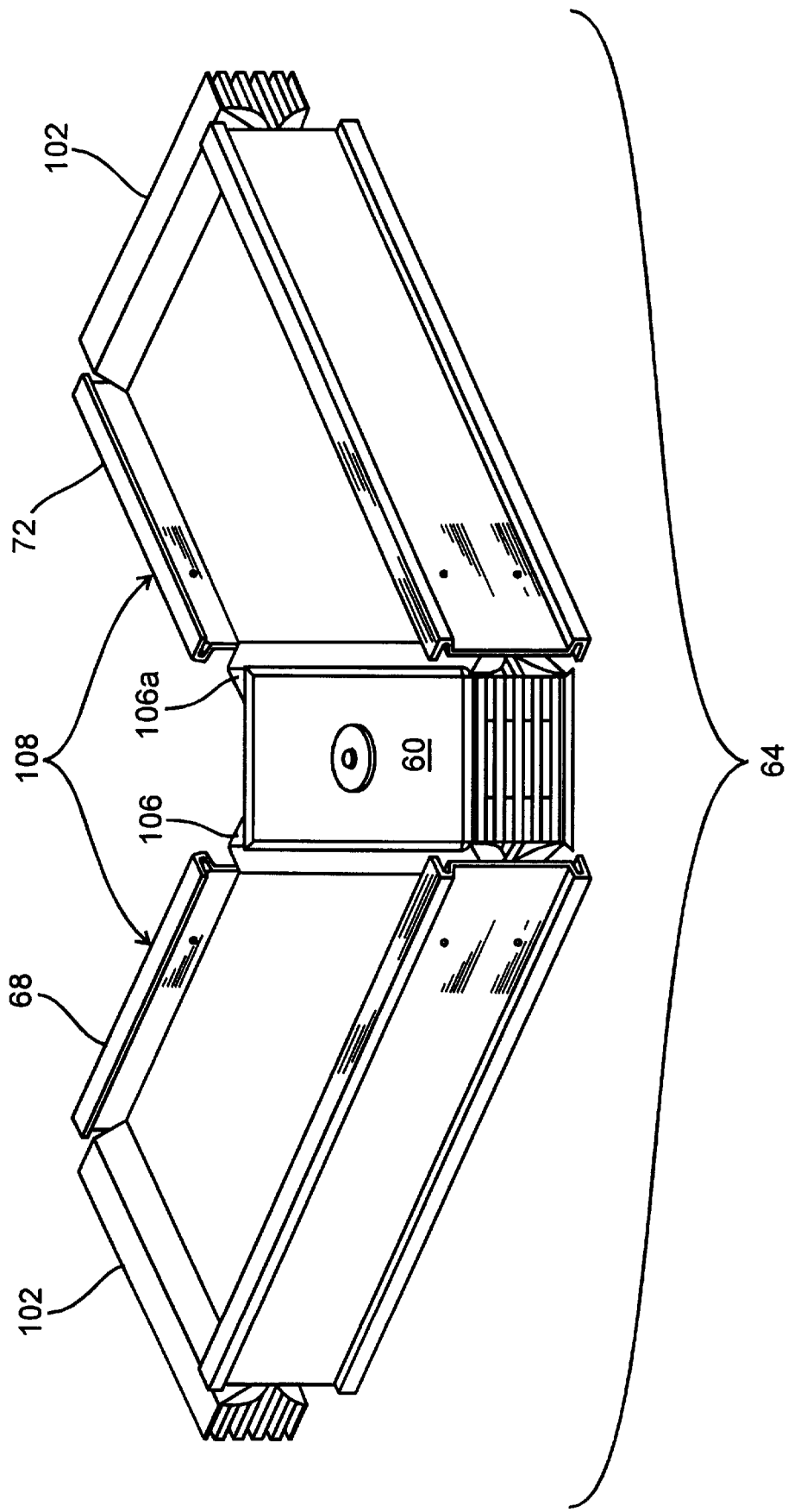
FIG. 5 is an isometric view of an assembled busway elbow in accordance with the present invention.

Referring now to FIG. 4 a busway electrical distribution system elbow in accordance with the present invention is generally indicated by reference numeral 64. The elbow 64 of the present invention includes a first elbow leg 68, a second elbow leg 72 and a joint connector 60 for electrically and mechanically connecting the first and second elbow legs, 68 and 72, respectively, together. Since each of the first and second elbow legs, 68 and 72, respectively, are manufactured in the same manner, only the first elbow leg 68 will be described. The first elbow leg 68 includes an enclosure 76. The enclosure 76 comprises a duct top 80, a duct bottom 84 and two duct sides 90. Housed within each of the enclosure 76 is a conductor stack 94. The conductor stack 94 is composed of a number of individually insulated generally flat electrical conductors 98 or busbars. These conductors 98 are arranged one upon another to form the conductor stacks 94. Generally one conductor 98 is provided for each electrical phase of the distribution system. However, in high current systems the enclosure 76 may enclose multiple conductor stacks 94, each conductor stack 94 carrying a generally equal portion of the total system current. The first and second elbow legs, 68 and 72, respectively, are similar in construction to a standard straight section in that the duct tops 80 and bottoms 84 and each of the enclosed conductors 98 are constructed from single pieces of material and therefore require no welding or grinding. Also, each of the first and second elbow legs, 68 and 72, respectively, includes one standard end 102 and 102a such as found at both ends of a busway straight section. When the standard ends 102 and 102a are connected to standard ends of other busway sections, the busway run will continue along a common longitudinal axis of the connected busway sections. Each of the first and second elbow legs, 68 and 72, respectively, has one miter cut end, 106 and 106a, respectively, wherein the enclosures 76 and 76a and conductors 98 are miter cut to a predetermined angle. The miter angle is chosen such that when the miter cut ends 106 and 106a of the first and second elbow legs, 68 and 72, respectively, are placed in a juxtaposed position, a desired angle 108 (FIG. 5) is maintained between the first and second legs, 68 and 72, respectively. This desired angle 108 is usually 90°, but could be some other desired angle 108. The duct tops 80 and bottoms 84 and the conductors 98 are flared along the mitered ends such that a joint connector 60 can receive the conductors 98 and duct tops 80 and bottoms 84 of both the first and second legs, 68 and 72, respectively, for making an electrical and mechanical connection between the two legs. The flare runs generally parallel to the mitered ends 106 and 106a and provides just enough separation between the stacked conductors for a portion of the joint connector 60 to be received therebetween as shown in the assembled elbow 64 of FIG. 5.

Figure 6:
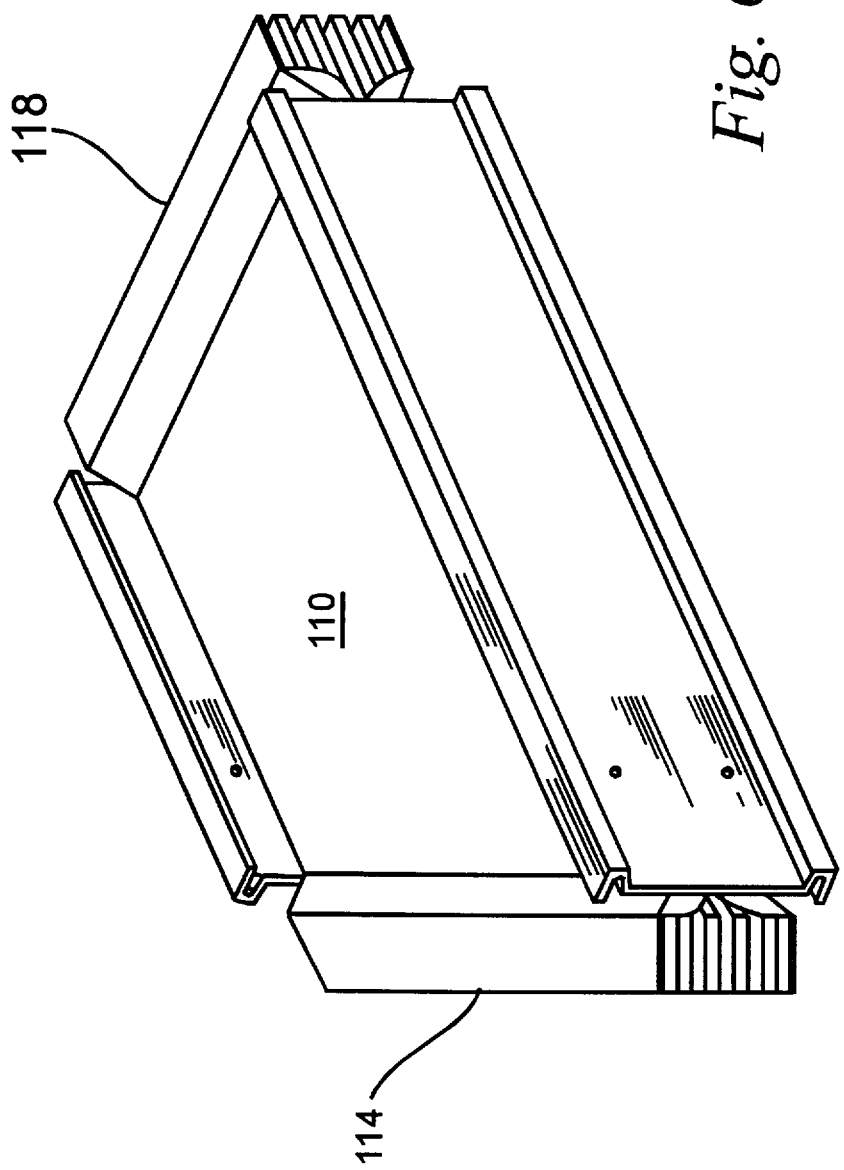
FIG. 6 is an isometric view of a busway offset center section in accordance with the present invention.

Referring now to FIG. 6, when an offset is required, a third or middle leg 110 is employed. The third leg 110 is again constructed generally as a straight section, but includes a first mitered end 114 cut to produce the desired angle 108 between the third leg 110 and the first leg 68. The third leg 110 has a second mitered end 118 cut such that it is generally parallel to the first mitered end 114 so that the desired angle 108 is maintained between the third leg 110 and the second leg 72. When a 90° offset is assembled, the first leg 68 will be offset from the second leg 72 by a distance approximately equal to the length of the third leg 110 plus the spacing of two joint connectors 60. Desired angles 108 other than 90° can be obtained by changing the angle of the miter cut accordingly.

I claim:

1. A busway elbow fitting comprising:
   a first straight busway section having a housing and a plurality of generally flat electrical conductors enclosed within said housing, said first straight section having one standard terminating end and one mitered end wherein said housing and said electrical conductors are miter cut to a predetermined angle with respect to said first straight section;
   a second straight busway section having a housing and a plurality of generally flat electrical conductors enclosed within said housing, said second straight section having one standard terminating end and one mitered end wherein said housing and said electrical conductors are miter cut to a predetermined angle with respect to said second straight section, said mitered ends of said first and second busway sections being complementary such that when said mitered ends are placed in juxtaposed position a desired angle is formed between said first and second busway straight sections, and;
   a joint connector, placed intermediate said mitered ends for electrically connecting said electrical conductors of said first and second straight busway sections together forming said elbow fitting.

2. The elbow fitting of claim 1 wherein said mitered ends of said first and second busway sections are configured to slidably receive said joint connector.

3. A busway offset fitting comprising:
   a first straight busway section having a housing and a plurality of generally flat electrical conductors enclosed within said housing, said first straight section having one standard terminating end and at least one mitered end wherein said housing and said electrical conductors are miter cut to a predetermined angle with respect to said first straight section;

a second straight busway section having a housing and a plurality of generally flat electrical conductors enclosed within said housing, said second straight section having one standard terminating end and at least one mitered end wherein said housing and said electrical conductors are miter cut to a predetermined angle with respect to said second straight section;

a third straight busway section having a housing and a plurality of generally flat electrical conductors enclosed within said housing, said third straight section having a first mitered end wherein said housing and said electrical conductors are miter cut to a predetermined angle associated with said mitered end of said first straight busway section and a second mitered end wherein said housing and said electrical conductors are miter cut to a predetermined angle associated with said mitered end of said second straight busway section, said first mitered end of said third busway section being complementary to said mitered end of said first straight busway section such that when said mitered ends are placed in juxtaposed position a desired angle is formed between said first and third busway straight sections, said second mitered end of said third busway section being complementary to said mitered end of said second straight busway section such that when said mitered ends are placed in juxtaposed position a desired angle is formed between said first and third busway straight sections; and;

a pair of joint connectors, one being placed intermediate said mitered end of said first straight busway section and said first mitered end of said third straight busway section and another being placed intermediate said mitered end of said second straight busway section and said second mitered end of said third straight busway section for electrically connecting said electrical conductors of said first, second and third straight busway sections together forming said offset fitting.

4. The elbow fitting of claim 3 wherein said mitered ends of said first, second and third busway sections are configured to slidably receive said joint connector.

* * * * *